UNITED STATES PATENT OFFICE.

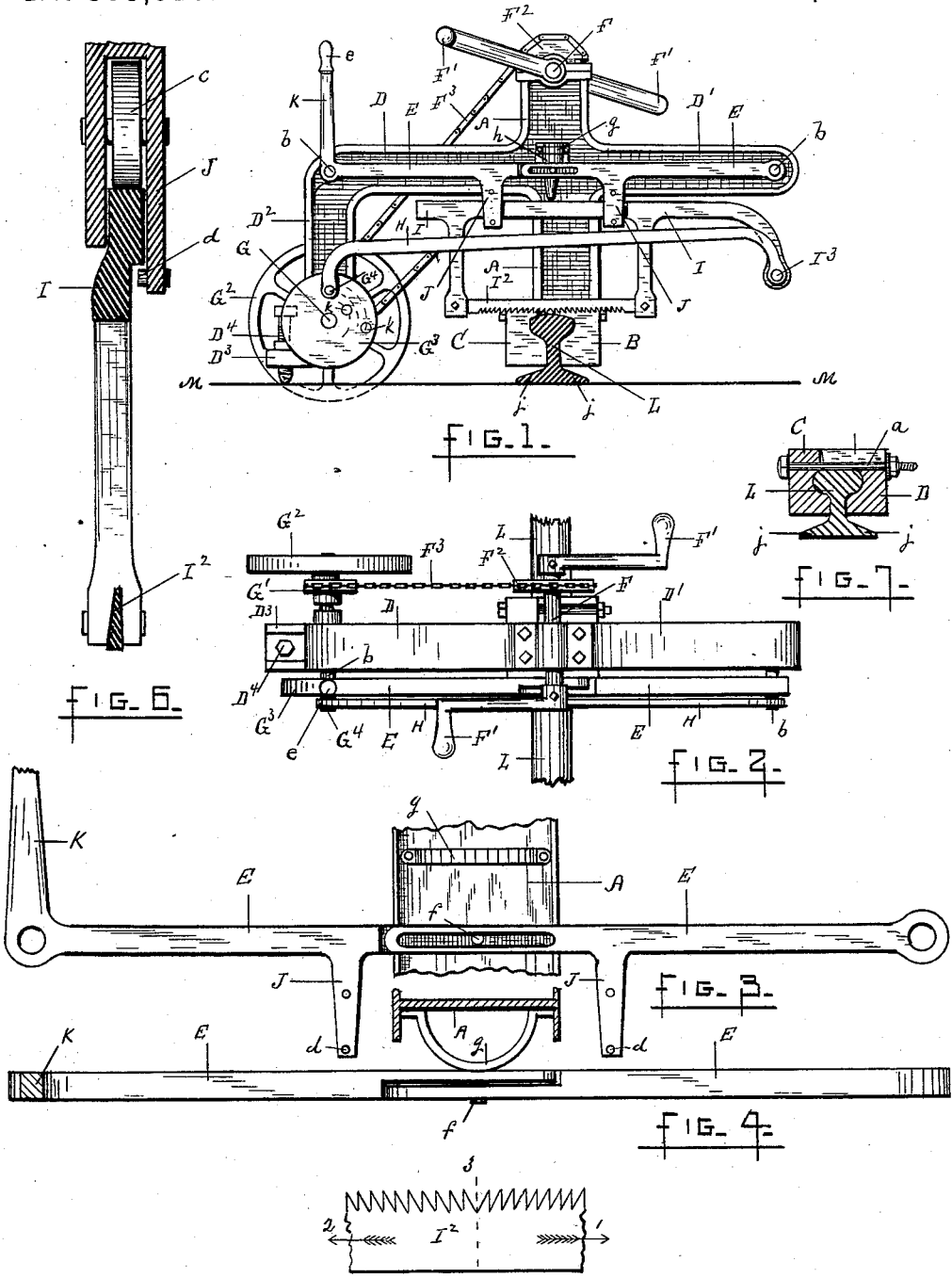

CHARLES G. McLEOD, OF WORCESTER, MASSACHUSETTS.

MACHINE FOR SAWING RAILROAD-RAILS.

SPECIFICATION forming part of Letters Patent No. 393,916, dated December 4, 1888.

Application filed March 3, 1887. Serial No. 229,631. (No model.)

*To all whom it may concern:*

Be it known that I, CHARLES G. McLEOD, a citizen of the Dominion of Canada, residing at Worcester, in the county of Worcester and State of Massachusetts, have invented certain new and useful Improvements in Machines for Sawing Railroad-Rails, of which the following is a specification, accompanied by drawings, forming a part of the same, in which—

Figure 1 represents a front view of the machine. Fig. 2 is a top view of the same. Fig. 3 is a sectional view of the saw and a portion of its supporting-frame. Fig. 4 is a front view of the pivoted levers forming a part of the saw-guide. Fig. 5 is a top view of the same. Fig. 6 is a view of a portion of the saw, and Fig. 7 is a sectional view of the device for clamping the rail.

Similar letters refer to similar parts in the several views.

My invention relates to an iron-sawing machine adapted to sawing railroad-rails, and designed for use in cutting off the ends of rails which have become battered by continuous use, leaving the central and uninjured section with their ends smoothly and squarely sawed, so they may be relaid.

A denotes the supporting-frame, which consists of a post, either cast with or attached to a foot or base, B, made to conform to the shape of the rail on the tip and one side and extending along the rail from six to twelve inches. A detachable piece, C, is bolted to the side of the foot B by means of bolts $a$, passing through the piece C and lying in grooves or channels in the upper surface of the foot B. The piece C is also made to conform in shape with the form of the rail, so the rail may be firmly clamped between the foot B and the piece C, thereby securely connecting the rail and the frame A. A short distance above the rail are the horizontal arms D D', extending from the post and carrying the studs $b\,b$, on which are pivoted the levers E E. The arm D is carried downward at $D^2$, and is provided with the foot $D^3$, in which I place an adjusting-screw, $D^4$. In the top of the frame is journaled the short shaft F, having the cranks F' F'', by which power is applied to the machine, and a sprocket or chain wheel, $F^2$. In the leg $D^2$ is journaled a shaft, G, having a sprocket or chain wheel, G', a balance-wheel, $G^2$, and a crank-wheel, $G^3$, having a crank-pin, $G^4$. A pitman-rod, H, connects the crank-pin $G^4$ with the frame I, which carries a saw, $I^2$, adapted for sawing iron or steel. The frame I of the saw slides in the arms J J, which extend downward from the levers E E, and which serve as guides for the saw-frame.

Friction-rolls $c$ are placed in the arms J, Fig. 6, in order to reduce the friction on the saw-frame, and pins $d$, Fig. 6, are inserted beneath the edge of the frame, so the saw-frame and saw may be raised by raising the levers E E and their attached arms J J. The levers E E are pivoted on the studs $b\,b$, and to one of the levers I attach a lever, K, having a handle, $e$, so the saw-frame can be conveniently raised.

The levers E E are connected at their ends by means of a stud, $f$, in the end of one of the levers and entering a slot in the other lever, so the ends of the levers will move together and both of the levers be operated by the handled lever K. A semicircular band, $g$, is attached to the upright post A, in which a cup, $h$, Fig. 6, is placed, containing soda-water, which is allowed to drip in the saw-kerf as the operation of sawing is carried on.

In the operation of sawing, the guide-arms J J will follow the saw-frame down as the saw advances through the rail L, and the levers E E may be made heavy enough to impart the requisite pressure to the saw; or a weight or spring may be applied in any of the well-known methods to the levers E E. The rail L is placed upon a supporting frame-work, whose upper surface is denoted by the line M M, Fig. 1, and the frame attached by clamping the foot or base B on the rail, as described, by means of the piece C and the bolts $a$. The foot $d^3$ is supported on the surface M M by the adjusting-screw $D^4$, which allows the foot $D^3$ to be raised or lowered until the rail rests squarely on its flange J J, Fig. 1. The saw $I^2$ is brought in contact with the top of the rail, as seen in Fig. 1, and power applied to the crank-shaft F, and through the chain-wheels $F^2$ and G' and chain $F^3$ to the shaft G, imparting rotary motion to the crank-wheel $G^3$ and a reciprocating motion to the saw $I^2$.

As the operation of sawing the rail begins, the pressure upon the saw $I^2$ may be regulated by means of the hand-lever K by either raising or depressing the saw-frame I. The throw of the crank and motion of the saw can be readily varied by changing the crank-pin in the holes $k\,k$, which are at different distances from the center of the crank-wheel $G^3$.

The saw $I^2$ is made thinner at the back than on the toothed edge, as shown in the sectional view in Fig. 6, in order to allow the proper clearance and to reduce the friction upon the sides of the saw. I also make the teeth of one-half the saw with their cutting-edges facing in an opposite direction to those of the other half, as shown in Fig. 5, so that as the saw is moved in the direction of the arrow 1 the teeth at the right of the center line of the saw only will be engaged in cutting, and when the saw moves in the direction of the arrow 2 those teeth on the left of the center line (denoted by the broken line 3 4) will be engaged in cutting. By this means I cause the saw to cut in both directions and equalize the resistance on the saw and crank-wheel $G^3$. I do not confine myself, however, to any special form of saw or any special arrangement of teeth. Neither do I confine myself to any special method of communicating motion to the crank-shaft G from the crank-shaft F.

What I do claim as my invention, and desire to secure by Letters Patent, is—

1. In a machine for sawing railroad-rails, the combination, with a frame for supporting the operating parts, of clamping-jaws by which it is attached to the rail to be sawed, guides by which the saw-frame is maintained at right angles with the rail, and a saw-frame having a reciprocating motion in said guides, and said saw-frame and guides being capable of a vertical motion, whereby the saw is lowered to or raised from the work, substantially as described.

2. The combination, with a supporting-frame, of the crank-shaft F, connected crank-shaft G, crank-pin $G^4$, pitman H, saw-frame I, and guides by which said saw-frame is held in a plane at right angles with the rail to be sawed, substantially as described.

3. The combination, with a saw-frame carrying a saw and means, substantially as described, for imparting a reciprocating motion to said saw-frame, of the saw-guides consisting of levers pivoted to the supporting-frame and provided with slotted arms, in which said frame is held, substantially as described.

4. The combination, with a reciprocating saw-frame and means, substantially as described, for actuating the same, of the saw-lifting device consisting of a lever pivoted to the frame, with its free end engaging the frame of said saw, substantially as described.

5. The combination, with a supporting-frame and a reciprocating saw-frame and means for actuating the same, substantially as described, of a saw held in said frame, and having its teeth on one side of its center formed to cut in one direction only and its teeth on the opposite side of its center formed to cut in the opposite direction only, substantially as described.

6. In a machine for sawing railroad-rails, the combination, with a frame supporting the operating parts of the machine, of a foot forming a vise arranged to seize the rail to be sawed, said foot consisting of a fixed jaw arranged to fit the side of the rail, and a movable opposing jaw arranged to fit the opposite side of the rail, with means whereby said movable jaw is pressed against the side of the rail, substantially as described.

7. The combination, with a supporting-frame carrying sawing mechanism and having a foot or base, B, arranged to fit the side of the rail, of the detachable piece C and connecting-bolts $a$, substantially as described.

8. The combination, with a reciprocating saw-frame having connected means, substantially as described, for actuating the same, of the pivoted levers E E, having the slotted arms J J, said levers being connected at their free ends, substantially as described.

CHARLES G. McLEOD.

Witnesses:
RUFUS B. FOWLER,
EDWIN C. BLAKE.